Sept. 8, 1970  L. E. PHILYAW ET AL  3,527,567
ANALYTICAL DISTILLATION BY GAS CHROMATOGRAPHY
Filed Sept. 15, 1967  3 Sheets-Sheet 2

INVENTORS:
L. E. PHILYAW
M. J. O'NEAL, JR.
BY: *Louis J. Bovasso*
THEIR ATTORNEY INVENTORS:
L. E. PHILYAW
M. J. O'NEAL, JR.
BY: *Louis J. Bowman*
THEIR ATTORNEY 3,527,567
ANALYTICAL DISTILLATION BY
GAS CHROMATOGRAPHY
Larry E. Philyaw, Austin, and Milburn J. O'Neal, Jr.,
Pasadena, Tex., assignors to Shell Oil Company, New
York, N.Y., a corporation of Delaware
Filed Sept. 15, 1967, Ser. No. 668,075
Int. Cl. B01d 15/08; G01n 31/08
U.S. Cl. 23—230
10 Claims

ABSTRACT OF THE DISCLOSURE

A gas-liquid chromatographic method and apparatus for analyzing organic samples containing both volatile and non-volatile materials. The sample desired to be analyzed is passed through an injection port and into a gas-liquid chromatograph column. The temperature of the port is set so as to flash any volatile materials within the sample. The flashed material is analyzed by temperature-programming of the column. If any residue remains in the column or the port, the port and column are back-flushed. The inlet port temperature is increased and oxygen is introduced in order to oxidize the heavy residue of the sample to carbon dioxide. After combustion, the excess oxygen is removed and the remaining carbon dioxide is detected, thereby measuring the non-volatile residue of the sample.

BACKGROUND OF THE INVENTION

Field of the invention

The invention relates to a technique of analyzing materials such as organic materials containing non-volatile materials using gas-liquid chromatography; and, more particularly, measuring the non-volatile residue of the organic materials.

Description of the prior art

The distillation curve is a simple and widely used means of characterizing the identity of a petroleum fraction. Because true boiling-point distillations are costly and time-consuming, the refiner depends for most purposes on Engler-type distillation. There are many times, however, when the more accurate boiling-point information afforded by precision distillation would be desirable. This is especially the case in applying computer-simulated models of refining units to optimize refinery operations.

Thus, the principle of variable-temperature gas-liquid chromatography (GLC) has been applied to the problem of obtaining true boiling-point distillation data quickly and efficiently. Programmed temperature GLC has been used to obtain accurate true boiling-point curves when the stationary phase is a nonpolar liquid which separates the volatile components of a sample according to boiling point. With this apparatus, accurate true boiling data can be obtained on petroleum fractions up to 930° F. end point with an analysis time of less than 85 minutes.

However, when heavy crudes are involved, the only previous method employed for obtaining this type of data on heavy oils is a combination of precision distillation and vacuum Engler distillation. The precision distillation is normally limited to a maximum temperature of approximately 650° F. At that point, the distillation normally is stopped, the apparatus cooled, and the sample transferred to a vacuum Engler apparatus. The vacuum Engler distillation is a one-plate distillation which must be run under vacuum (2 torr.) resulting in considerable inaccuracies above 650° F. Thermal cracking of the sample begins to occur at approximately 1000° F. where the distillation must be halted. The residue is determined by weighing. Another major disadvantage of this method is the time requirement which is approximately forty hours.

Another proposed GLC technique which may be capable of determining the non-volatile residue of crudes and other heavy oils requires two complete analyses for full boiling range materials as crude oils. This method is inaccurate and unreliable as applied to crude oils. Since the heavy ends of the crude oils are left in the GLC column, there is considerable interference from this residue on subsequent runs worsening with each analyses as these heavy ends accumulate.

Another prior art method using a GLC arrangement especially for analyzing crude oils is described in Pat. No. 3,253,455. This arrangement is simply designed to prevent the non-distillable portion of a sample from entering and otherwise fouling the partition column. However, no means are provided for direct measurement of the amount of non-volatile residue.

In summary, gas-liquid chromatography can be used to analyze samples with boiling points up to about 1150° F. However, material boiling higher than this cannot be eluted through the GLC column without excessive interference from "bleeding" of the column stationary phase due to vaporization and/or decomposition at high temperatures. Consequently, when analyzing materials such as crude oils, the non-volatile residue remaining in the column is not measured. Previous attempts to determine the amounts of material not vaporized by means of an internal standard and/or accurate sample size measurement have led to poor accuracy and repeatability of analyzing runs.

SUMMARY OF THE INVENTION

It is an object of this invention to obtain true boiling-point data of organic materials comparable to the data obtained by precision distillation with the additional advantages of shorter analysis time and smaller sample size.

It is another object to provide a technique for rapidly and accurately analyzing heavy organic materials such as heavy crude oils which contain non-volatile materials and to directly measure the residue of such materials.

It is a further object to accurately measure the non-volatile residue of crude oils and to completely remove the measured residue from the system, thus rendering it clean for subsequent analyses.

In the analysis of a crude oil, the GLC technique of this invention passes the oil sample through an injection port which is heated to such a temperature as to flash the volatile material (approximately 650° F.). The volatile fractions of the flashed material are analyzed by temperature programming of the GLC separation column to which the volatile fractions have been passed. The eluted volatile fractions are converted to carbon dioxide prior to reaching a thermal conductivity detector in order to avoid the need for response factors. If the oil sample contains any residue after the volatile material is analyzed, the injection port and GLC column are back-flushed to remove any slightly volatile material still in the port or column, the injection port temperature is raised to combustion temperature, and oxygen is introduced in order to oxidize the residue to carbon dioxide. After combustion, the excess oxygen is removed by passage through a hot tube packed with copper wire and the remaining carbon dioxide is detected in a thermal conductivity detector by well known procedures.

The technique allows the quantitative measurement of the non-volatile residue and also provides for its removal from the system, thus rendering it clean for subsequent analyses. This apparatus can be used to rapidly analyze blended products which contain polymers or other non-volatile components, to analyze shales, crude oil source rocks, etc.

The invention disclosed is an uninterrupted analysis requiring approximately two hours to attain an equivalent boiling point of 1000° F. The determination of the residue at a given boiling point is more accurate than distillation due to the inherently better resolution of the GLC column. However, the primary advantage is the relatively short analysis time. Higher equivalent boiling points, up to 1170° F., can be obtained in an approximate analysis time of only six hours.

DESCRIPTION OF THE PREFERRED EMBODIMENT

Figure 1:
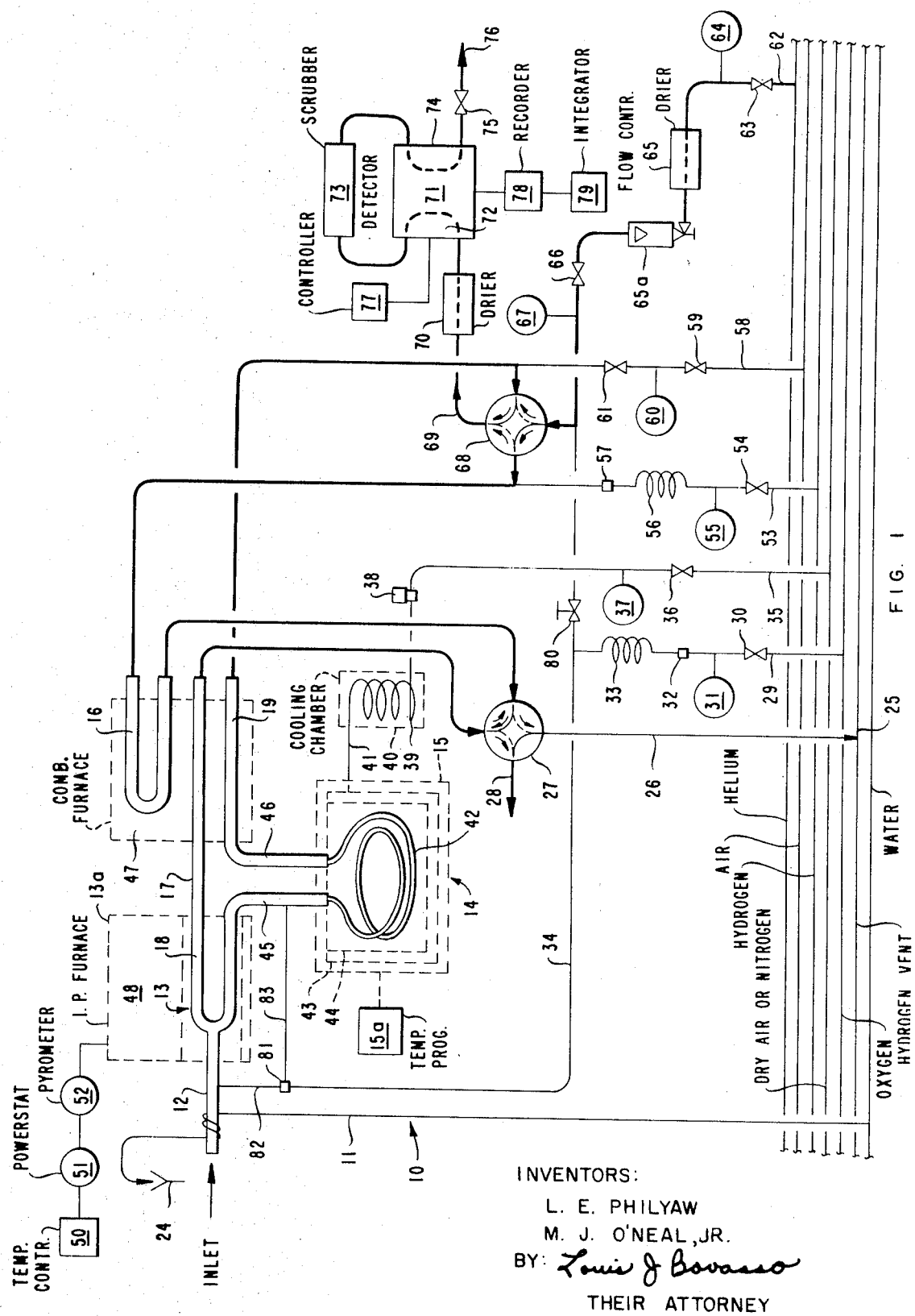
FIG. 1 is a diagrammatic representation of a preferred technique for carrying out the teachings of the invention.
Figure 2:
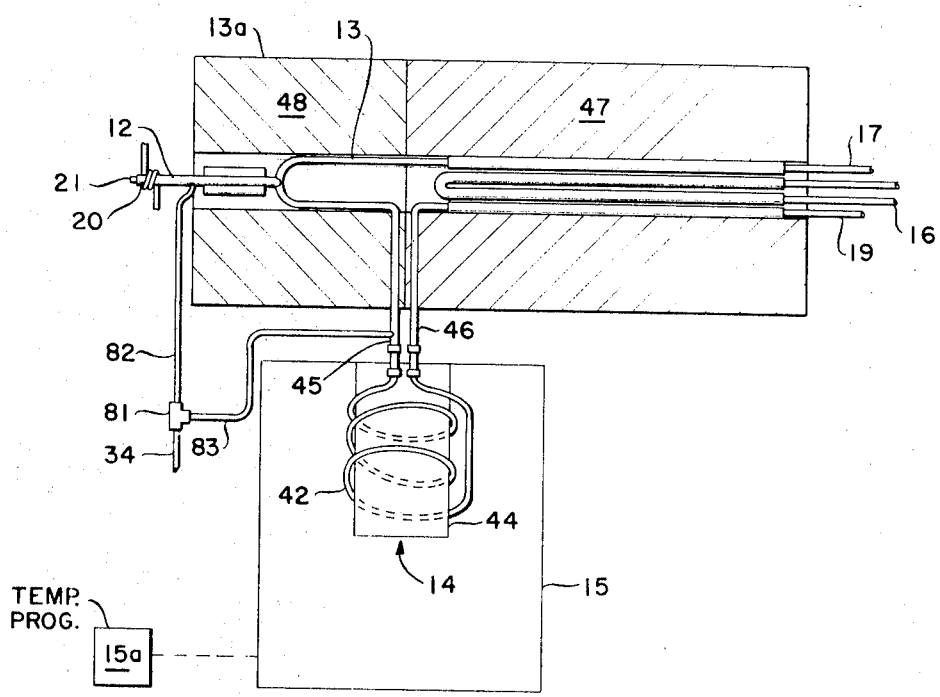
FIG. 2 is a vertical sectional view of a portion of the diagrammatic representation of FIG. 1.

Turning to the drawings, FIG. 1 shows a diagrammatic representation of a system 10 for carrying out the concepts of the invention. Water is injected into the system 10 through water line 11 and onto a cooling line 12 which is an extension of a hollow, preferably tubular injection port or chamber 13 formed within a housing 13a. Injection port 13 can best be seen in FIG. 2 where a GLC column, represented by element 14, is shown surrounded by oven 15. A temperature programmer 15a, such as the Model 40 temperature programmers manufactured by the F and M Scientific Company, operatively engages and cooperates with oven 15 for increasing the column temperature in a reproducible fashion. A hollow oxygen scrubber tube 16 is shown in FIG. 2 as located between an arm 17 of a U-shaped backflush hollow combustion tube 17 of injection port 13 and a second hollow combustion tube 19 engaging column 14. The tubes 16, 17 and 19 are actually one behind the other but are shown one beside the other in FIGS. 1 and 2 for ease of illustration.

Figure 3:
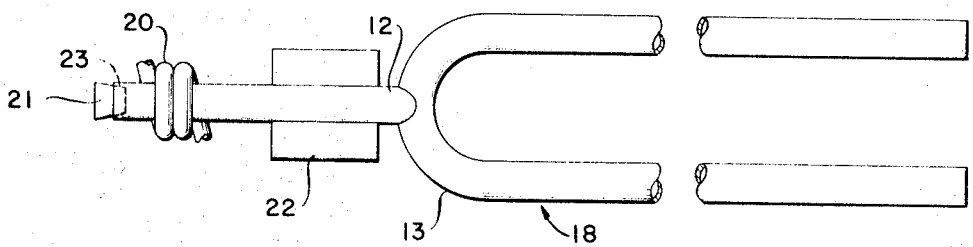
FIG. 3 is a plan view of a portion of the diagrammatic representation of FIG. 1.

Injection port 13 is shown in detail in FIG. 3 where a coiled portion 20 of water line 11 is shown soldered or otherwise fastened to the cooling line or portion 12 to port 13 in order to prevent decomposition of the puncturable silicone seal 21 which stops up the open end of coil portion 12. A thermowell 22, adapted to contain a thermocouple for measuring the temperature of coil portion 12, preferably engages the tube portion 12 attached to the cooling coil.

The water line 11 flows from coil 20 to a drain 24 (FIG. 1). A hydrogen vent line 25 is connected to hydrogen line 26 which communicates with a four-port switching valve 27 for removing hydrogen from system 10. Valve 27, by means of a vent 28 to the air, diverts excess air directly to the atmosphere so that no damage is done to the system by oxygen, as will be discussed hereinbelow.

Oxygen is injected into system 10 through oxygen line 29 which passes through pressure regulator 30, pressure gauge 31, quick-connect fitting 32 and capillary 33 for controlling the introduction of oxygen into the helium slipstream line 34 as will be discussed in detail hereinbelow.

Dry air or nitrogen is injected into system 10 through nitrogen line 35, pressure regulator 36, pressure gauge 37 and a normally open electro-pneumatic relay 38 for controlling the flow of cold air or nitrogen to the column 14. The air or nitrogen is cooled by being passed through cooling coil 39 of cooling chamber 40. Coil 39 is preferably copper tubing immersed in a Dry Ice-isopropyl alcohol mixture within chamber 40.

A tubing line portion 41 connects coil 39 with the gas-liquid chromatograph (GLC) column 14. The column 14 comprises a hollow helical coil 42 housed in an outer container 43 and is in communication with injection port 13. An inner container 44 surrounds coil 42 and is wrapped with an electric heating element (not shown) in order to supply heat to column 14. Glass wool is preferably packed between the outer and inner containers 43 and 44 to provide insulation.

The GLC column 14 is preferably packed with 15% weight silicone rubber on 60–80 mesh firebrick such as normally used in true boiling-point analyses.

The column 14 is coupled to the injection port 13 by means of hollow transfer line 45. Housing 13a includes a pair of furnaces 47 and 48. Both the injection port 13 and line 45 must be heated to insure that the sample is vaporized and does not condense before reaching the combustion furnace 47. Since the sample will be converted to carbon dioxide prior to detection as will be discussed shortly, the detector 71 may be operated at ambient temperature without control. Thus, electric heating elements (not shown) are wrapped around injection port 13 and transfer line 45 to provide heat. These elements are connected in series and are balanced so that the line 45 is always slightly hotter than injection port 13.

A second hollow transfer line 46 connects column 14 to hollow combustion tube 19. Combustion furnace 48 surrounds injection port 13 for heating port 13. Combustion furnace 47 surrounds hollow oxygen scrubber tube 16 and hollow combustion tubes 17 and 19 for heating tubes 16, 17 and 19 as seen in FIGS. 1 and 2. The temperature of furnace 47 is pre-set and fixed at the preferred temperature.

A conventional temperature controller 50, powerstat 51 and pyrometer 52 operatively engage injection port 13 and furnace 48 for controlling the temperature of these elements.

Hydrogen can be injected into system 10 through hydrogen line 53 which passes through a pressure regulator 54, pressure gauge 55, capillary tube 56, a normally disconnected quick-connect fitting 57 and into oxygen scrubber tube 16.

Air is injected into system 10 through air line 58 which passes through pressure regulator 59, pressure gauge 60, normally closed toggle valve 61 and into combustion tube 19.

Helium is injected into system 10 through helium line 62 which passes through pressure regulator 63, pressure gauge 64 and into a molecular sieve drier 65 packed with molecular sieve pellets. Line 62 then passes through a flow controller 65a, a normally closed togggle valve 66, pressure gauge 67, and a 4-port backflush valve 68. From backflush valve 68, helium can flow either to scrubber tube 16 or to combustion tube 19 in furnace 47 as indicated by the arrows in valve 68. Tubes 16, 17 and 19, inside furnaces 47 and 48, are preferably packed with copper oxide in wire form impregnated with approximately 1% weight iron oxide. The copper oxide of tubes 17 and 19 are preferably coated with 2.5% weight ferric nitrate monohydrate. Thus, tubes 17 and 19 liberate nitrogen oxides upon conversion of ferric nitrate to iron oxide during the regeneration procedure, as will be explained more fully below. The copper oxide of tube 16 will be reduced to copper before use as also discussed below. Steel wool plugs preferably hold the packing of tubes 16, 17 and 19 in place.

Helium can also flow from backflush valve 68 through helium line portion 69 into a drying tube 70 in order to remove water prior to detection. Both carbon dioxide and water could be detected, but this would lead to an increased signal requiring detector 71 to be operated above 100° C.

Drying tube 70 is preferably packed with calcium sulfate in the inlet half and magnesium perchlorate in the outlet half. The ends of drying tube 70 are preferably plugged with glass wool. The helium flows from tube 70 into the detector side 72 of a thermal conductivity detector 71. From detector side 72, the helium flows through a carbon dioxide scrubber 73, preferably packed with an absorbent for carbon dioxide, such as Ascarite which is a sodium hydroxide-asbestos absorbent. The ends of scrubber 73 are also preferably plugged with glass wool. The helium then leaves scrubber 73 and passes through the reference side 74 of detector 71 and past helium toggle vent-valve 75 to vent 76.

The detector 71 is preferably insulated and protected from air currents. The sensing elements (not shown) of detector 71 are preferably 8000 ohm thermistors for ambient temperature service and are controlled by detector bridge circuit controller 77. The detector 71 is located a sufficient distance from column 14 and combustion tubes 18 and 19 in order to avoid heat transfer problems. The detector 71 is preferably enclosed in a housing (not shown) packed with glass wool, thus rendering the detector 71 sufficiently stable so that drift during an analysis is negligible.

In this manner, carbon dioxide and other acidic oxides, e.g., sulfur dioxide, are removed by the scrubber 73 as is well known in the art. This procedure provides a flow of pure helium through the reference side 74 and completeness of combustion may be checked with well known tests.

A conventional recorder 78 and printout integrator 79 operatively engage detector 71 for recording the information obtained. The integrator 79 preferably consists of a voltage-to-frequency converter and a preset counter for recording data as is well known in the art.

A helium slipstream is taken from helium line 64 and flows along helium line 34 to junction 81 and to the cooling coil portion 12 of injection port 13 and transfer line 45. A flow control valve 80 controls the flow of the helium as will be explained in detail hereinbelow. This preheated helium carrier gas slipstream prevents condensation of the sample in the cooled area of coil portion 12. The engagement of the slipstream with injection port 13 is shown in detail in FIG. 2 where the slipstream from valve 80 extends to a junction 81. Branch portions 82 and 83 extend from junction 81. First branch portion 82 communicates with the cooling coil portion 12 of injection port 13 and a second branch portion 83 communicates with transfer line 45.

In operation, prior to injecting a sample into system 10, water is introduced onto the injection port cooling coil portion 12 as can be seen in FIG. 1 in order to cool coil portion 12; from there, the water flows to drain 24. With the inlet furnace 48 at vaporization temperature (about 650° F.), the sample is injected through seal 21 by means of a sampling device (not shown) which is adapted to puncture seal 21 so that the sample can be injected into coil portion 12 of injection port 13. If the sample is solid at room temperature, the sample can either be melted prior to injection or be inserted into seal 21 by means of providing a sample holder in seal 21. The sampling device preferably remains in seal 21 and coil 12 until the analysis is finished. Helium is introduced through line 62 into the 4-port backflush valve 68 and helium slipstream line 34 with branch portions 82 and 83. The helium is used as a carrier gas to move the sample from coil portion 12 to the GLC column 14. The helium is passed through drier 65 in order to remove possible moisture and/or impurities. Thus, helium passes from valve 68 and junction 81 into first and second branch portions 82 and 83, thereby carrying the sample to column 14. By this procedure, the sample is vaporized in the heated-inlet coil portion 12 by furnace 48 and swept by the helium carrier gas into column 14. The temperature of the column 14 is preferably programmed by means of temperature programmer 15a at a uniform rate. A separation by boiling point, comparable to distillation, takes place in the column 14 as is well known in the GLC art.

The hydrocarbon vapors emerging from column 14 pass through transfer lines 45 and 46 to arm 17 and the combustor tubes 17 and 19 heated by combustion furnace 47. Thus, the vapors are combusted to carbon dioxide and water by the copper oxide in the tubes 17 and 19. The carbon dioxide passes from the combustion area (i.e., furnace 47, arm 17 and tubes 17 and 19) to valve 68 and through drying tube 70 where any water present in the carbon dioxide is removed. The carbon dioxide then passes through the detector side 72 of the detector 71 where the carbon dioxide is detected and recorded by means of controller 77, recorder 78 and integrator 79 as is well known in the art. The resulting peak areas are integrated automatically and the print-out values obtained from the integrator 79 simulate distillation cuts.

During this analysis, dry air or nitrogen is injected into relay 38 and through cooling coil 39 of cooling chamber 40 and into column 14 during the off-cycle of the column temperature programmer 15a in order to allow for the heating effect of port 13 and transfer lines 45 and 46 on column 14. This is preferably done only at the beginning of the cycle; i.e., until the column heat losses are sufficient to permit control without cooling.

The helium slipstream, mentioned briefly above, is set as follows. The helium flow through system 10 from helium line 62 is adjusted by means of closing helium slipstream valve 80 and placing the backflush valve 68 in the backflush position while the column 14 is being heated. The valve 80 is then gradually opened until the helium column pressure drops to approximately eighty percent of its original value. The pressure drop indicates that part of the helium flow has been diverted through the helium slipstream line 34; the exact quantity not being critical. Thus, the helium carrier gas forces the sample into column 14 as discussed previously. The operation of system 10 is automatic up to the point of backflushing to determine the residue remaining in injection port 13 and column 14.

GLC column 14 is usually stable up to $n$-$C_{40}$. In other words, the volatile portion of any residue-containing sample is chromatographed in the usual manner, normally to the maximum permissible column temperature which depends on the condition of column 14. This temperature is approximately 600° F. and usually corresponds to an equivalent atmospheric boiling point of 930° F. When the sample material boiling up to 930° F. has been eluted, the direction of the carrier gas flow through 14, tubes 18 and 19 and port 13 is reversed by means of backflush valve 68 in order to remove any residue remaining in column 14.

Figure 4:
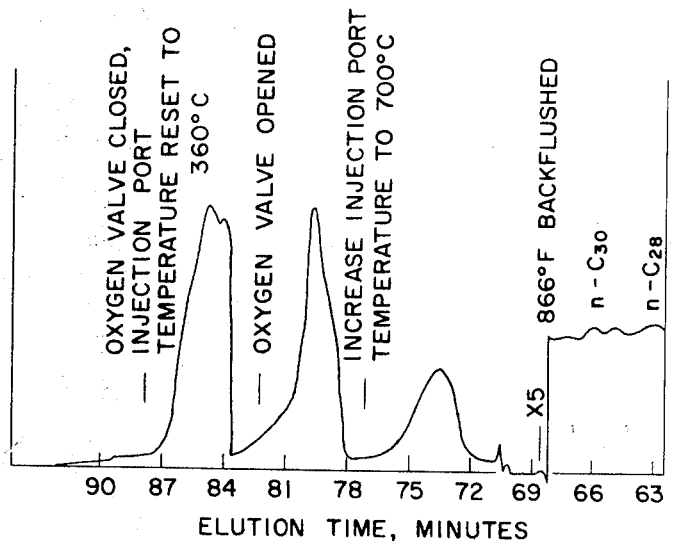
FIGS. 4 through 6 are graphical representations utilizing the results of this invention to determine various types of desired information.

Backflushing may begin at any time. Backflushing is carried out by switching backflush valve 68 to its backflush condition and immediately recording the reading on the preset temperature controller 50. After the peak from backflushing column 14 has emerged (see the discussion below concerning FIG. 4), the temperature controller 50 for injection port 13 is turned to maximum voltage and the peak that emerges represents the heavier residue, which was present in injection port 13 that is vaporized and/or cracked upon heating to 700° C. When the controller 50 indicates that the injection port has reached a temperature of 700° C., the oxygen supply is preferably regulated to about 3 p.s.i. by means of valve 30, gauge 31 and the oxygen quick-connect fitting 32, normally disengaged, is inserted but not locked. The oxygen purges the fitting 32 and then the fitting 32 is locked. This fitting 32 differs from the hydrogen quick-connect fitting 57 in that fitting 32 has a single-end shut-off. The upstream end is open so that it can be purged of air before connection. The oxygen pressure is then preferably set at about 4 p.s.i. and a third peak is obtained since the oxygen reacts with any material remaining in the injection port 13, the excess oxygen being removed in the tube 16 containing the heated copper wire. The oxygen is allowed to flow until recorder 78 returns to its baseline position and the fitting 32 is disconnected. The final count is recorded on the preset controller 50. By this arrangement, the backflushed material does not condense in the top of injection port 13.

It can thus be seen that in the case of heavier samples, it is possible to elute the residue in preferably three separate portions, three separate peaks being obtained. This is shown graphically in FIG. 4 as residue peaks obtained by true boiling-point GLC analyses of a Heidleberg-Eucutta-Yellow Creek crude oil, a known heavy crude oil. The first peak is obtained by merely backflushing and represents the material remaining in column 14 before backflushing is initiated. The material backflushed from the column 14 passes through injection port 13 and into the residue-combustion furnace 47 where it is converted to carbon dioxide and water.

The second peak is obtained by raising the temperature of injection port 13 from its normal temperature of approximately 340° C. to a temperature of 700° C. This peak represents the heavier residue which was present in port 13 and is vaporized and/or cracked upon heating to 700° C.

The third peak is obtained by introducing oxygen into port 13 by mixing it with the helium slipstream. Any material remaining in port 13 is thereby oxidized. Generally, light crude oils, which contain only a small amount of heavy residue, exhibit only a very small peak or no peak at all upon oxygen introduction. In such cases, if the quantity of non-eluted material is small, practically all of the residue is eluted in the first two peaks.

The elution of the residue in preferably three separate portions is carried out primarily for the purpose of preventing the detector 71 from being overloaded. Since some heavy crude oils contain as much as 50% residue, the detector 71 could easily be overloaded and give a nonlinear response if the residue from such samples is eluted in a single peak. In addition, the relative magnitudes of the three peaks may be useful for characterizing certain types of samples.

After an analysis has been completed, the oxygen scrubber tube 16 must be regenerated with hydrogen while column 14 is cooling off. The combustion tubes 17 and 19 are regenerated with air after column 14 has cooled to room temperature or lower. The cooling chamber 40 and coil 39 are used to recool column 14.

The temperature programmer 15a, in conjunction with relay 38 and chamber 40, permits subambient temperature programming of oven 15. The action of relay 38 is proportional, i.e., it gradually closes as the voltage output of the temperature programmer 15a increases during the heating cycle and it gradually opens as its voltage output decreases during a cooling cycle.

During this cooling period, the oxygen scrubber tube 16 is regenerated as follows. The helium input is stopped and the helium vent valve 75 is closed. The backflush valve 68 is switched to the closed position and the switching valve 27 is set to its regenerate position. The quick-connect fitting 57 of the hydrogen line 53, normally disconnected, is inserted and locked in place. This fitting 57 has a double-end shut-off when disconnected so it also serves as a valve. Hydrogen is then injected into system 10 for a few minutes; fitting 57 is disconnected, valve 68 is set to normal position, and helium valve 63 is opened. This process flushes hydrogen from the system and regenerates oxygen scrubber tube 16. Regeneration of the oxygen scrubber tube 16 is necessary after each analyses if the column 14 has been backflushed and oxygen used. At this point, regeneration valve 27 is reset to its normal position and the helium vent valve 75 is opened to prepare for a sample analysis, or, alternatively, the combustion tubes 18 and 19 are regenerated with air.

The tubes 18 and 19 are regenerated as follows. The injection of helium is stopped and the helium vent valve 75 is closed, the backflush valve 68 is closed and switching valve 27 is switched to its regenerate position. The regeneration vent 28 is opened since the air must pass through column 14 in order to regenerate both tubes 18 and 19. Air is introduced as previously described for a few minutes. The column 14 is preferably at room temperature or lower to prevent possible oxidation of the stationary phase.

Prior to injecting the sample for a subsequent analysis, helium is injected into system 10 to remove any moisture. The helium is passed through drier 65 so as to remove any impurities in the helium carrier gas. After a few minutes, the vent 28, normally open during flushing by helium injection, is closed; the backflush valve 68 is set to backflush, and the helium valve 63 is opened to flush air out of system 10. Then valve 27 is set to its normal position and the helium vent valve 75 is opened. The system 10 is now ready for a fresh sample. The heavy lines in FIG. 1 indicate helium flow during analysis.

Below is a comparison of a conventional distillation analysis and the GLC analysis by the invention for measuring the residue content of a crude oil. The asterisk, in both cases, indicates the injection of oygxen after heating the injection port 13 to 700° C.

LIGHT CRUDE OILS

| Distillation analysis, percent w.: | GLC analysis percent w. |
| --- | --- |
| 27.0 | 26.3, 27.7* |
| 9.7 | 9.8, 10.4* |

HEAVY CRUDE OILS

| | |
| --- | --- |
| 27.1 | 18.9, 27.3* |
| 37.9 | 31.8, 37.6* |
| 54.6 | 41.2, 54.0* |
| 55.7 | 45.1, 55.3* |

These data indicate that, within experimental error, oxygen injection is not required for relatively light crude oil samples. In the case of heavier crude oils, however, heating of the injection port 13 without subsequent introduction of oxygen is not enough for accurate results.

Figure 5:
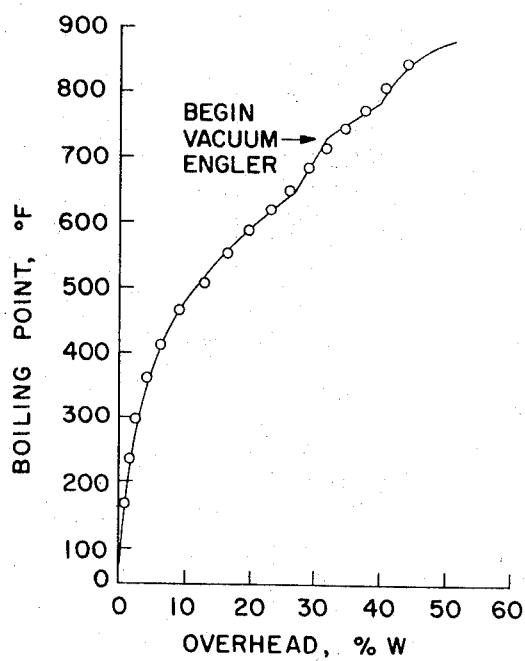

The agreement between precision distillation and the true boiling point GLC analyses by the invention for a heavy crude oil is shown graphically in FIG. 5. The solid lines indicate precision distillation, as for example, a 30-Plate Oldershaw process and Vacuum Engler Distillation. The O's indicate the GLC distillation values obtained using the teachings of the invention.

Thus, the GLC analyses correlate well with those obtained by a combination of precision distillation and vacuum Engler distillation. Light crude oils can be analyzed with greater accuracy than heavier, asphaltic crude oils. The oxygen-injection step is preferably carried out with all types of crude oils, since it is difficult to predict whether coke formation will take place upon heating the injection port 13 to 700° C.

Although this application discusses the analyzing of crude oils, the system is particularly well suited for analyzing many heavy distillate streams which previously could not be analyzed by true boiling-point GLC.

The true boiling-point data obtained by this process are initially GLC parameters; i.e., chromatographic area as a function of retention time. It is desirable to express this information in more conventional terms, e.g., cumulative weight percent vs. true boiling point. As a consequence of conversion to carbon dioxide, any fraction of total chromatographic area is proportional to the carbon content of the fraction of sample from which it arises. In using conversion to carbon dioxide, it is assumed that weight percent of carbon equals weight percent of hydrocarbon, which appears to be valid within the limits of accuracy of the method. With this assumption, area percent equals weight percent.

Figure 6:
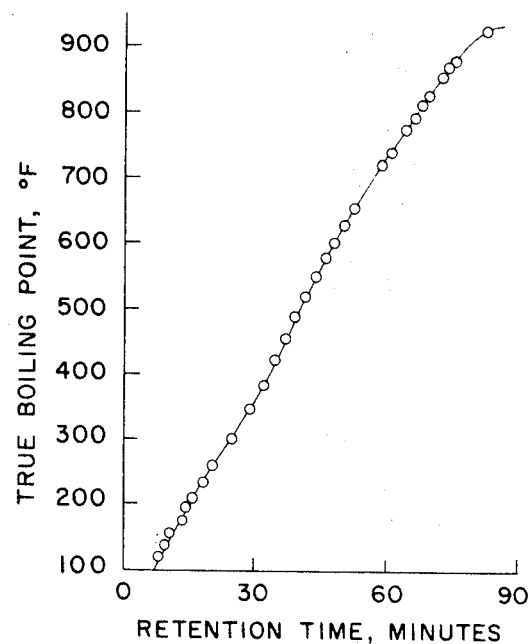

Retention time can be converted to overhead temperature of the equivalent precision distillation by eluting a blend of compounds having known boiling points under conditions identical to those used in the analyses. The blend should contain components over the entire boiling range covered and this relationship can be calibrated to obtain true boiling-point readings. For example, FIG. 6 shows graphically a plot of boiling point vs. retention time to obtain a calibration for true boiling-point distillation up to 930° F. True boiling-point readings can be read directly from this graph when the retention time is known.

Although a preferred embodiment of the invention has been discussed, minor variations and alterations may occur to one skilled in the art and it is to be understood that such modifications fall within the spirit and scope of the invention.

We claim as our invention:

1. A GLC apparatus for analyzing an organic sample for volatile and non-volatile components comprising:
   a housing having a hollow injection port adapted to receive said sample desired to be analyzed;
   said port having an inlet portion in communication with a combustion portion;
   cooling means operatively engaging said inlet portion for cooling said inlet portion;
   carrier gas inlet means in communication with both the inlet and combustion portions of said injection port for introducing carrier gas therein;
   first heating means operatively engaging said injection port for heating the injection port;
   GLC column means including a helical coil with one end in communication with the combustion portion of the injection port for distilling said sample;
   oxygen injecting means communicating with the carrier gas inlet means for injecting oxygen through the injection port and the column means;
   second heating means operatively engaging said column means for heating said column means;
   combustion means in communication with the other end of the helical coil of said column means adapted to oxidize any volatile materials eluted from said column means to carbon dioxide upon being heated;
   third heating means operatively engaging said combustion means for heating said combustion means;
   carbon dioxide detection means in communication with said combustion means for detecting the amount of carbon dioxide eluted from said combustion means; and
   backflushing means operatively engaging said combustion means and adapted to reverse the direction of flow of any gas through the column means in order to remove any residue within said column means.

2. The system of claim 1 including drying means for removing moisture and impurities operatively engaging the gas inlet means.

3. The system of claim 1 including temperature programming means operatively engaging and cooperating with the GLC column means for programming the temperature of said column means.

4. The system of claim 1 including drying means coupled to the detection means operatively engaging the combustion means for removing any moisture from the combustion means.

5. The system of claim 1 including column cooling means for cooling said column means; said column cooling means including a cooling gas inlet; and a cooling bath in communication with said cooling gas inlet coupled to said GLC column means.

6. The system of claim 1 including oxygen removal means operatively engaging the combustion portion of the injection port for removing oxygen from the system.

7. The system of claim 1 including regeneration means operatively engaging the injection port and the oxygen removal means for regenerating the injection port and the oxygen removal means.

8. The system of claim 1 wherein the carbon dioxide detection means includes an acidic oxide remover operatively engaging the detection means adapted to remove carbon dioxide and other acidic oxides from the system.

9. The system of claim 8, including recording means for recording the amount of carbon dioxide removed by the remover.

10. A method for analyzing a liquid sample for both volatile and non-volatile components utilizing a GLC column having a hollow helical coil wherein a hollow injection port having an inlet portion and a combustion portion is in communication with one end of the coil of said column, the other end of said coil being in communication with carbon dioxide combustion means, said combustion means being in communication with carbon dioxide detection means, said method comprising the steps of:
   injecting said liquid sample into the inlet portion of the injection port;
   cooling said sample within said inlet portion;
   injecting a carrier gas into said inlet portion and flowing the sample into the GLC column, while heating the injection port;
   heating the GLC column to an approximate maximum temperature of 600° F. in order to elute the sample;
   flowing the eluted sample to the combustion means while heating the combustion means, thereby converting the eluted sample to carbon dioxide;
   flowing the carbon dioxide to the carbon dioxide detection means in order to detect the amount of carbon dioxide eluted from the combustion means;
   backflushing the flow of the sample by reversing the direction of flow of the carrier gas within the GLC column in order to remove any residue remaining in the column;
   raising the temperature of said injection port to approximately 700° C.; and
   injecting oxygen into the carrier gas in order to prevent any backflushed residue from condensing in the injection port.

References Cited

UNITED STATES PATENTS

| | | | |
|---|---|---|---|
| 3,169,389 | 2/1965 | Green | 73—23.1 |
| 3,236,603 | 2/1966 | Durrett | 73—23.1 |
| 3,304,159 | 2/1967 | Hinsvark | 23—232 |
| 3,403,978 | 10/1968 | Favre | 23—253 X |
| 3,425,807 | 2/1969 | Levy | 73—23.1 X |
| 3,433,053 | 3/1969 | Houtman | 73—23.1 |

JOSEPH SCOVRONEK, Primary Examiner

S. MARANTZ, Assistant Examiner

U.S. Cl. X.R.

23—232, 253, 255; 55—67; 73—23.1